Dec. 9, 1941.    P. A. KINZIE ET AL    2,265,435
TUBE VALVE
Filed Feb. 11, 1938    2 Sheets-Sheet 2
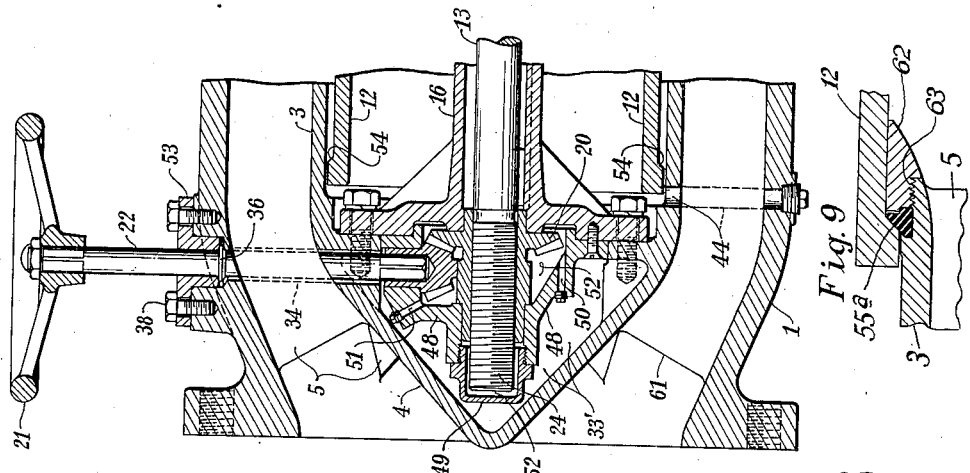
INVENTORS.
Phillip A. Kinzie
John L. Savage
BY
ATTORNEY.

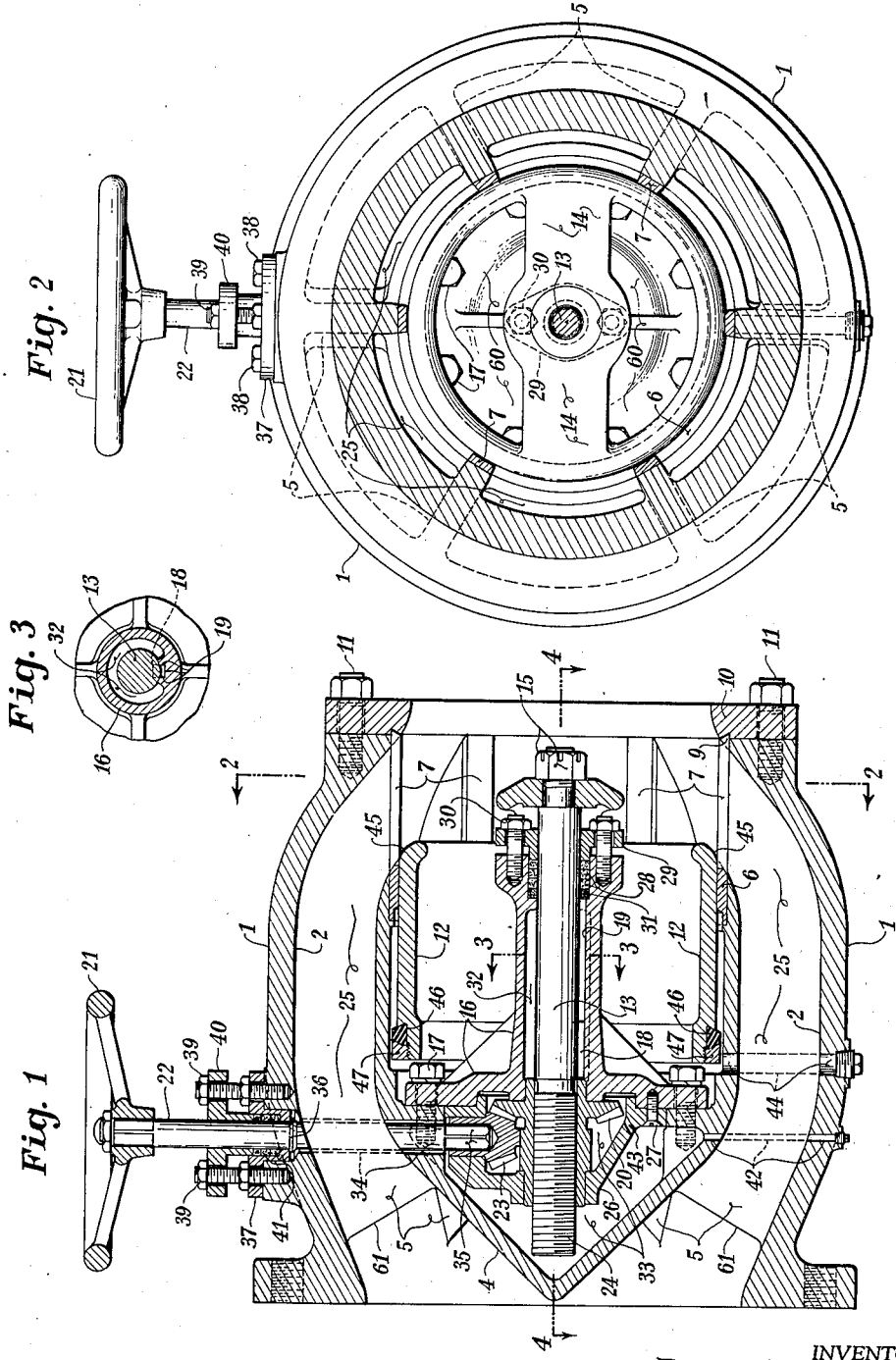

Patented Dec. 9, 1941

2,265,435

UNITED STATES PATENT OFFICE 2,265,435

TUBE VALVE

Phillip A. Kinzie and John L. Savage, Denver, Colo., assignors to Universal Hydraulic Corporation, Denver, Colo., a corporation of Colorado Application February 11, 1938, Serial No. 189,976

20 Claims. (Cl. 137—139)

In general this invention relates to an improved means for interrupting or regulating fluid through a pipeline or conduit. In particular it relates to an improved method of constructing, actuating, and sealing of a closure member contained within and concentric with the fluidway and body member.

The simplicity and positiveness of operation of the invention makes it particularly well adapted for use in penstocks, high pressure steam lines, oil and gas pipelines, domestic water mains, and in fact to any installation where valves can be applied to control or interrupt fluid flow through a pipe or orifice. The fact that the interrupting means is always hydraulically balanced makes the valve particularly well suited to installations where fluids under high pressure must be controlled.

Subsequent description and explanation will make clear the means and methods by which the following objectives of the invention are attained:

The invention has as an object, the concentric disposition of the encasing and interrupting elements with respect to the annular fluidway through a tube valve.

The invention has as an object, the disposition of a tubular interrupting element in a counterbore in the body element that is within the interior walls of the annular water passage and on the axial center line of fluid flow.

The invention has as an object, the actuation of a tubular interrupting element, by means which produce longitudinal motion thereof to effect closure, and which are primarily actuated from the exterior of the containing body.

The invention has as an object, an actuating means for a tubular fluid interrupting element, said means to be actuated externally to the valve and be lubricated within the valve by an integral oil chamber, said chamber to be protected against intrusion of the controlled fluid by a packing element, and to be drainable and refillable through passageways to the outside of the valve body while the valve is in service.

The invention has as an object, a means for confining a lubrication chamber for the elements within a valve, comprising an actuating means, to the shape required for lubricating said means, said lubrication chamber to be protected from intrusion of the controlled fluid by a packing element.

The invention has as an object, the disposition of the actuating means for the tubular fluid interrupting element, whereby said means is protected from scaling or corrosive propensities of the controlled fluid, a construction which insures a maximum efficiency in the operation of the actuating means.

The invention has as an object, circumferential sealing at both ends of a tubular fluid interrupting element, by means of metallic contact of one end thereof with the interior surface of the orifice in the valve body and contact of a resilient sealing means on the opposite end thereof with an annular seat within the tube-containing counterbore in the valve body.

The invention has as an object, circumferential sealing at both ends of a tubular fluid interrupting element, by means of metallic contact of one end thereof with the interior surface of the orifice in the valve body, and contact of an annular seat on the opposite end thereof with a resilient sealing element retained within the counterbore in the valve body containing the tube, said resilient element to be so constituted that pressure of the controlled fluid assists in the sealing operation.

The invention has as an object, simplicity in the retention of the resilient seal, so that replacement in the case of deterioration or wear will be easily effected.

The invention has as an object, simplicity of parts and assembly thereof in the valve which permits their easy removal for inspection or repairs.

The invention has as an object, the disposition of the packing gland within the valve which permits its being repacked while the valve is in service in the closed position.

The invention has as an object, the construction and disposition of the elements in a closure means which have liberal operating clearances, and thereby insure proper functioning of the valve despite possible deposits of scale thereon by the controlled fluid.

The invention has as an object, the disposition of the tubular closure element with respect to the co-operating valve body so that wide ranges of thermal variation will not impair or prevent successful operation of the valve.

The invention has as an object, the symmetry and concentricity of the fluidway through a valve body and closure element.

The invention has as an object, the disposition of the encasing and closure elements of a valve which permit smooth conditions of fluid flow regardless of whether the valve is fully open or partially closed.

The invention has as an object, the contour and disposition of a tubular closure element within a body element, so that the pressures thereon both radially and longitudinally due to fluid flow remain balanced at all times and thereby prevent undue effort being required for operation or any tendency for the closure element to move except by the actuating means.

The invention has as an object, the construction and disposition of elements in a fluid closure means, wherein no chambers or cavities which might serve as pockets for compressive fluids such as air, gas, or steam while the valve is used for controlling non-compressible fluids such as oils or water, are present, and thereby prevent sudden or unpremeditated movement of the fluid closure element and also prevent sudden pressure changes within the valve and pipe line with the attendant fluid hammer which under high pressures attains almost explosive violence.

The invention has as an object, a smooth balanced means for interrupting the flow of fluids under extreme conditions of velocity or temperature in such a manner that pressure changes resulting from the closure thereof will be gradual and avoid sudden changes of pressure with the resulting fluid hammer of explosive character.

The invention has as an object, the smooth positive actuation of a balanced tubular closure element, so that in opening or closing, the pressure changes of gases or high-pressure steam will be gradual and thereby prevent rapid vaporization or condensation of their constituents with the explosive character of such rapid changes.

The invention has as an object, a means for circulating either heating or cooling fluids inside the sealed enclosure containing the operating and controlling mechanism whenever the thermal conditions of the controlled fluid make such a condition necessary or desirable.

The invention has as an object, a means for introducing air into the space within the tubular closure element for decreasing the negative pressure, or vacuum, which will be present therein, when the valve is discharging a fluid under high velocity; the purpose of such means being to secure smoother discharge flow and to reduce the tendencies for cavitation.

In short, the invention has an object, a simple, balanced means for interrupting or regulating fluid flow through a pipe, conduit or orifice.

For the purpose of clarifying the foregoing objects and for satisfying the patent statutes, there will be now described the specific embodiments of the invention which have been illustrated on the accompanying drawings, forming a part hereof, and wherein:

Fig. 1 is a longitudinal section along the vertical center line of a tube valve with the closure tube in the wide open position;

Fig. 2 is a section taken on the plane 2—2 of Fig. 1;

Fig. 3 is a section taken on the plane 3—3 of Fig. 1;

Fig. 4 is a section taken on the plane 4—4 of Fig. 1, but shows the closure tube in the fully closed position;

Fig. 5 is an enlarged fragmentary section showing the disposition and operation of the resilient seal with the valve in the fully closed position;

Fig. 6 is a section taken on the plane 6—6 of Fig. 5;

Fig. 7 is a fragmentary section, analogous in plane of cutting and disposition of elements to Fig. 1 but showing an alternate method of construction;

Fig. 8 is a fragmentary section, analogous to Fig. 5, but showing an alternate type of resilient sealing means; and Fig. 9 is a fragmentary section, analogous to Fig. 8, and shows an alternate method of retaining the resilient seal.

By reference to the accompanying drawings it will be seen that the body 1 (Figs. 1, 2, and 4) is composed of the outer portion 2 and the inner cylindrical portion 3 and conical portion 4; said portions being integrally connected by the ribs 5. The liner and seat member 6 (Figs. 1, 2, 4, 5, and 6) is retained within the counterbore in the body portion 3 by the guide strips 7 which coincide with the ribs 5. The sloping tongue element 8 (Figs. 1 and 5) and a slot through the curved end of the liner 6 securely retain and position the inner end of the guide strips 7 while a similar tongue 9 on the outer end enters a mating slot in the seat and nozzle member 10. It is, therefore, apparent that when the nozzle 10 is clamped in place by the studs 11, both the seat member 6 and guide strips 7 will be simply but tightly retained in place. The closure tube 12 (Figs. 1, 2, and 4) is slidingly retained within the bore in the liner and seat member 6, and is connected to the actuating stem 13 through the integral spider portion 14 (Figs. 2 and 4), being secured thereto by the nut 15.

The stem 13 is supported and housed by the flanged tube 16 (Figs. 1, 3 and 4) which is secured fluid-tight to the body 1 by the bolts 17. The key 18 in the stem 13 is in sliding engagement with the keyway 19 in the flanged tube 16 and prevents the stem from rotating when rotation is imparted to the bevel gear 20 by the handwheel 21 through the handwheel stem 22 and the bevel pinion 23. The threaded portion 24 on the stem 13 enters a mating thread in the bore of the bevel gear 20; therefore, since the stem 13 cannot rotate, rotation of the bevel gear by the means described will cause the stem 13 with the attached closure tube 12 to move toward or away from the nozzle 10 and effect closing or opening of the valve by decreasing or increasing the outlet area of the fluidways 25.

It will be noted that the bevel gear housing 26 is attached to the flanged tube 16 by the screws 27 (Figs. 1 and 4) and is centered therein by a counterbore, a construction which permits the actuating unit to be assembled, adjusted and tested prior to placement in the valve. The outer diameter of the bevel gear housing serves as the means for centering the unit within the counterbore in the body 1.

The end of the flanged tube 16 (Figs. 1, 2, and 4) is sealed against intrusion of the controlled fluid by the packing 28 which is retained by the gland 29 and the studs 30. The metallic ring 31 in the bottom of the packing counterbore is inserted to close the gap left vacant by the keyway 19. Since the controlled fluid is excluded from the annular space 32 (Figs. 1, 3, and 4) around the stem 13, this space as well as the cavities 33 within the conical portion 4 of the body and within the bevel gear housing 26, can be filled with oil for lubrication of the gears and stem. These cavities are filled with oil, before the handwheel stem 22 is inserted, through the hole 34 in the rib 5, which is made slightly thicker at this point to accommodate the hole. The squared end 35, which enters a mating squared socket in the bevel pinion 23, permits easy assembly of the handwheel stem 22. The stem is held in place by the shoulder 36 (Fig. 1) which bears against the stuffing box 37 attached to the body by the bolts 38 (Figs. 1 and 2) and the studs 39. The studs 39 also serve to retain the gland 40 and the packing 41 which make it possible to mount the valve in any position, if necessary, without loss of the lubricating oil from the interior cavities. With the valve installed with the stem vertical as shown it is possible to drain the oil through the hole 42 at the bottom; furthermore, it will be apparent that this can be performed while the valve is in service in either the open or closed position. The hole 43 in the bevel gear housing (Fig. 1) is provided so that any leakage which does occur past the packing 28 will gravitate toward the bottom of the outer cavity and not cause corrosion of the gearing. Too, by periodically removing the plug in the hole 42, the accumulation of foreign fluid can be drained.

The hole 44 (Fig. 1) is primarily provided as a means for draining the controlled fluid from the interior of the valve body.

With the valve fully closed (Fig. 4) the rounded nose portion 45 on the closure tube 12 contacts the nozzle 10 and effects a seal, whereas the inner end of the closure tube is provided with a resilient seal 46 (Figs. 1, 4, and 5) which is retained thereon by the threaded collar 47. In closure the resilient seal is pressed tightly against the sloping face of the counterbore in the liner and seat member 6, a condition which causes it to be squeezed outward and bear tightly against the walls of the counterbore and seal the inner end of the closure tube against leakage. Since the inner seal is resilient, a fluid-tight contact around the periphery at both ends of the closure tube 12 is positively assured.

The alternate constructions shown on Figs. 7 and 8 are for illustrating a means of confining the lubrication chamber, and for depicting a different method of applying a resilient seal for the inner end of the closure tube. Parts in the alternates which are similar to the embodiment hereinbefore described will be designated by identical reference numerals.

The bevel gear housing 48 (Fig. 7) in the alternate embodiment is provided with the cap 49 and has a draining hole 50 and filling hole 51, provided with plugs, incorporated therein. This construction restricts the lubrication cavity 52 to the space within the housing, a factor of considerable importance in a large valve because of economy of oil. This construction also permits the lubrication cavity 52 to be filled before the unit is assembled in the valve body.

The handwheel stem 22 in the alternate embodiment is retained by the bearing cap 53 which bears against the shoulder 36. Since the flanged tube 16 is bolted to the body 1 fluid-tight, the space 33' will not be subject to intrusion of the controlled fluid; therefore, a packing gland on the stem is unnecessary for retaining the controlled fluid and can be eliminated as shown.

The construction of the inner end of the closure tube 12 (Figs. 7 and 8) is varied to provide an integral conical shoulder 54 around the periphery thereof. This shoulder 54, when the tube is in the closed position is brought snugly against the resilient seal 55 (Fig. 8) which is retained in the body 1 by the liner member 56. The flexible tip 57 will aid in sealing since pressure of the controlled fluid will seep through the clearance 58 between the liner 56 and closure tube 12 and enter the space 59 pressing the tip 57 more firmly against the conical shoulder 54.

From the foregoing description the simplicity of the design is apparent. The resilient seal 46 can be easily replaced by removing the nozzle 10 (Fig. 1) which will allow the guide strips 7 and liner 6 to come out, after which by removing the nut 15 the closure tube 12 can be slid out and the resilient seal 46 replaced by removing the threaded collar 47. The resilient seal 55 can be removed and replaced in a somewhat similar manner.

On Fig. 9 an alternate method for retaining a resilient seal 55a is shown. The seal is held in place by the liner member 62 which is attached to the inner cylindrical portion 3 of the body 1 by the threads 63. In this type of construction the guide strips 7 are eliminated, and the ribs 5 are terminated adjacent to the threads in the cylindrical portion 3 of the body 1 as shown on Fig. 9. This arrangement is particularly advantageous in small valves which would not require the guide strips 7 for supporting the closure tube 12. It will also be apparent that removal of the seal for inspection or replacement can be easily effected by removing the liner member 62.

It will be noted too that the packing 28 (Figs. 1 and 4) can be tightened or replaced while the valve is in service in the closed position (Fig. 4) through the openings 60 (Fig. 2) in the end of the closure tube 12.

Another mechanical advantage is the fact that liberal clearances can be allowed between the liner and seat member 6 and the closure tube 12. The liberal clearance is a distinct advantage, not only from the standpoint of manufacture, but also from the standpoint of operation in fluids of scale forming propensities or in fluids having a wide thermal range. In the case of scaling small clearances would be quickly filled with scale deposits, and large thermal variations might reduce small clearances so that the closure tube would stick and render the valve inoperative.

It will be noted how carefully the stem 13 as well as the actuating gearing are protected against the possibility of scaling or corroding, by retaining them in such a manner that except for a portion of the stem 13 none of the elements are exposed to the influence of the controlled fluid. This construction not only insures a long life of the elements involved, but also insures the maintenance of a high efficiency in the operation thereof.

From observation of the longitudinal contour of the fluidways 25 it will be apparent that smooth flow conditions will be obtained, regardless of the position of the closure tube 12. In order that the ribs 5 will offer little resistance to smooth flow they are streamlined by rounding the upstream or leading edge 61 and are curved inward at their junction with the guide strips 7 (Figs. 2 and 6).

When the valve is fully open as shown on Figure 1 and fluid is being discharged therethrough, owing to the fact that the discharge will take the form of a jet, the interior of the valve surrounding the closure tube 12 will be under a partial vacuum. Such a condition, if the pressures were not balanced, could result in making the valve very difficult to operate and in causing it to make undesired or sudden movements. By inspection of the drawings it will be apparent that all vacuum forces acting in one direction on the closure tube are balanced by forces acting in the opposite direction. It may be desirable under some conditions where the vacuum becomes too high to reduce it somewhat in order to secure better discharge characteristics and overcome the tendency to cavitation which is accentuated by vacuum conditions. This result may be accomplished by introducing air through the hole 44 or a series of such holes through the ribs 5.

It will also be noticed that since there are no internal cavities in the valve where compressible fluids, such as air or gas can collect, when the valve is in service with liquids, the possibility of sudden expansion of such entrapped air or gases is eliminated. This factor is important since a sudden expansion of entrapped air or gas within a fluid carrying pipe line causes a violent fluctuation of the pressure therein and sets up a reverberation of fluid hammer, through the pipes and connected system, which can become of almost explosive violence under high pressures. The undesirable result of such a condition can be readily appreciated.

The smoothness of operation of the closure tube 12 is insured by virtue of its direct mechanical operation and by the fact that it is almost perfectly balanced in all positions. The virtue of this condition can be appreciated in the controlling of liquids, for it prevents sudden changes in pressure with the resulting fluid hammer. Its virtue is no less important in the controlling of gases and steam, which are subject to changes from liquid to vaporous states, since under pressure these substances may liquefy, returning to the gaseous state upon release of the pressure thereon. It is for this reason that quick pressure changes in lines carrying such gases must be avoided; for rapid changes in pressures, which could occur in a confining chamber or chambers should a closure element be improperly controlled, would result in rapid condensation or vaporization of the constituents of the gas. Such rapid change in state with the attendant change in volume, would produce pressure disturbances in the containing pipe of explosive and destructive character. This possibility is carefully overcome and avoided in the embodiment of the invention.

The fact that the interior of the valve is subjected to partial vacuum conditions is advantageous for in handling very viscous fluids, such as heavy oil or tar, hot air or superheated steam can be introduced to the vacuum area through the hole 44 (Fig. 1) or a series of similar holes and thereby heat the viscous fluids to assist the flow thereof. And even in the absence of flow rapid enough to produce a vacuum the heating medium could be introduced by pressure. This feature would also be valuable for valves that were stuck because of coagulation or freezing of the controlled fluid.

From the foregoing description of the specific mechanical advantages as well as the innate advantages, the novelty, flexibility, and economic value of the invention can readily be appreciated. And whereas in the foregoing description there has been described the specific embodiments of the invention for the purpose of satisfying the patent statutes, it is, nevertheless, to be understood that in practicing the same, we may resort to any and all combinations and modifications falling within the scope of the appended claims defining the invention.

What is claimed is:

1. In combination with a valve body having removable means forming an outlet orifice, an inner body portion having one end closed and its opposite open end facing said orifice, a closure tube slidably received within said open end and axially movable relative to said orifice, and means supporting and guiding said tube during movement including a circumferential liner within the open end of said inner body portion and circumferentially spaced guide strips extending from said end toward said orifice, said strips each having its opposite ends in interfitting engagement respectively with said liner and with said orifice forming means.

2. In a valve having a seat formed at the perimeter of the valve outlet, means for controlling the flow of fluid through said outlet comprising a tubular closure open at both ends and movable axially of said seat, an inner body portion having an open cylindrical end receiving said closure and defining therewith an annular space open to the interior of said closure whereby fluid pressure reactions on said closure are balanced during opening and closing movements, said body portion and said closure each having an end portion overlapping an opposite end portion of the other transversely of said annular space, and packing material so arranged relative to said overlapping end portions as to be engaged thereby in the seated position of said closure.

3. In combination with a valve body having removable means forming an outlet orifice adjacent an opening therein, an inner body portion having one end closed and its opposite open end facing said orifice, a closure tube annularly spaced within said open end for axial movement relative to said orifice, means supporting and guiding said tube during such movement including a removable circumferential liner projecting inwardly of said open end and removable circumferentially spaced guide strips each engaging said liner at one end and received within a conforming portion of said orifice-forming means at the opposite end, and means forming a fluid-tight seal between said tube and body portion including a shouldered formation on said tube in overlapping relation to said inwardly projecting liner, said tube having a maximum diameter relative to the outer assembled diameter of said liner and strips as to permit removal of said tube through said body opening upon removal of said liner, said strips and said orifice forming means.

4. In a valve having a seat formed at the perimeter of the valve outlet, means for controlling the flow of fluid through said outlet comprising a tubular closure open at both ends and movable axially of said seat, an inner body portion having an open cylindrical end receiving said closure and defining therewith an annular space open to the interior of said closure whereby fluid pressure reactions on said closure are balanced during opening and closing movements, and overlapping means carried by said body portion and said closure for resiliently sealing said space in the seated position of said closure, said overlapping means including a liner projecting inwardly of said body portion to guide said closure and resilient packing material interlocking with said liner and said body portion.

5. In a valve, the combination comprising an inner body portion having a cylindrical recess at one end and facing the valve outlet, a tubular closure open at both ends and axially movable within said recess to interrupt the flow of fluid exteriorly of said body portion and through said outlet, and means preventing leakage of the interrupted fluid past said closure including packing material retained between overlapping portions of said body portion and closure, said packing material and at least one of said overlapping portions having companionate sloping surfaces, and said material being flexibly formed adjacent its sloping surface whereby pressure of the interrupted fluid compresses said material against the companionate sloping surface.

6. In a valve having annularly spaced outer and inner body portions, a tubular closure slidably received within an open end of said inner portion and longitudinally movable relative thereto in controlling the flow of fluid through the valve, means closing the opposite end of said inner body portion and within said closed end forming a chamber, means for moving said closure and having elements thereof within said chamber, means sealing said chamber against the intrusion of the controlled fluid, and means for introducing a lubricant into said chamber and for renewing said lubricant without interference with the functioning of said valve.

7. The combination with a valve body having an outlet which comprises an inner body portion closed at one end and open at the end facing said outlet, a fluid controlling tube telescoping within the open end of said body portion and having an open spider formation at its outer end, means for moving said tube axially of said outlet including an actuating stem secured at one end to said spider formation, and means supporting said stem comprising an enclosing tubular member having a flanged portion secured within the inner body portion of the valve.

8. The combination with a valve body having an outlet which comprises an inner body portion closed at one end and open at the end facing said outlet, a fluid controlling tube telescoping within the open end of said body portion and having an open spider formation at its outer end, means for moving said tube axially of said outlet including an actuating stem secured at one end to said spider formation, means forming a closed chamber within the closed end of said inner body portion including a flanged tube having its flange secured to the inner body portion and its tubular portion supporting said actuating stem interiorly thereof, and packing means forming a fluid tight seal between said stem and tube at the end adjacent said open spider formation.

9. The combination with a valve body having an outlet which comprises an inner body portion closed at one end and open at the end facing said outlet, a fluid controlling tube telescoping within the open end of said body portion and having an open spider formation at its outer end, means for moving said tube including an actuating stem axially disposed within said body portion and having one end secured to said spider formation, a flanged tube within which said stem is supported, the flanged portion of said tube being removably secured within the inner body portion adjacent its closed end and forming with said end a closed chamber into which the opposite end of said stem extends, means within said chamber for moving said stem longitudinally, and an operating spindle detachably engaging said last mentioned means for mechanically controlling the movement of said closure tube from outside of the valve body.

10. In a tube valve, an outer body portion having an inlet and an outlet, an annularly spaced inner body portion having a closed end of conical formation facing said inlet, and an opposite open end facing said outlet, a closure tube open at both ends and telescoped within the open end of said inner body portion and longitudinally movable into open and closed positions relative to said valve outlet, a flanged tube removably secured within said inner body portion and defining in part a chamber adjacent said closed end, means for moving said closure tube including an actuating stem and gear means within said chamber controllable from outside of the valve, said stem being supported within said flanged tube and having extended ends one secured to said closure tube and its opposite threaded end disposed within said chamber in cooperative engagement with said gear means, and means supporting said gear means comprising an enclosing housing secured to said flanged tube.

11. In a tube valve, an outer body portion having an inlet and an outlet, an annularly spaced inner body portion having a closed end of conical formation facing said inlet, and an opposite open end facing said outlet, a closure tube open at both ends and telescoped within the open end of said inner body portion and longitudinally movable into open and closed positions relative to said valve outlet, a flanged tube removably secured within said inner body portion and defining in part a chamber adjacent said closed end, means for moving said closure tube including an actuating stem, bevel gearing within said chamber and an operating spindle detachably connected to said gearing for controlling movement of said closure tube from outside of the valve, said actuating stem being supported within said flanged tube and having one extended end secured to said closure tube and the opposite extended end threaded for engagement with an internally threaded element of said gearing, and means comprising a housing secured to said flanged tube for supporting said gearing and forming a fluid tight enclosure therefor whereby said housing, said gearing and said flanged tube may be assembled and tested, and a fluid lubricant retained within said chamber, prior to installation of said assembled parts within said inner body portion.

12. In a tube valve having an annular flow passage communicating with the valve outlet, telescoping parts disposed inwardly of said passage and including a tubular member having an open end facing said outlet, said member being axially movable into spaced relation with said outlet for opening and into contact with said outlet for closing, means for moving said parts relatively to include movement of said member into the closed position in the direction of fluid flow and movement into the open position in the opposite direction, means for enclosing said moving means from contact with controlled fluid within said valve, and means for subjecting said member during such movements to substantially balanced pressure conditions at opposite ends.

13. In a tube valve having an annular flow passage communicating with the valve outlet, inner and outer telescoping parts disposed inwardly of said passage each having one end open and facing said outlet, said parts including an inner tubular member axially movable into spaced relation with said outlet for opening and into contact with said outlet for closing, means for moving said parts relatively to include movement of said member into the closed position in the direction of fluid flow and into the open position in the opposite direction, means for enclosing said moving means within one of said parts from contact with controlled fluid within said valve, and means for subjecting said member during such movements to substantially balanced pressure conditions radially of portions received interiorly of said outer telescoping part and substantially equal to pressure conditions throughout said valve.

14. In a tube valve having an annular flow passage communicating with the valve orifice, inner and outer telescoping parts disposed inwardly of said passage and relatively movable axially of said orifice for controlling fluid flow, said parts including an inner tubular member open at one end and facing said orifice, means for moving said parts relatively into extended and contracted positions to include movement of said member into the extended position for closing said valve and into the contracted position for opening said valve, means for enclosing said moving means from contact with controlled fluid within said valve, and means subjecting said tubular member to substantially balanced fluid pressure conditions at opposite ends and radially of portions received interiorly of said outer telescoping part.

15. A tube valve comprising inner and outer body portions forming an annular fluid flow passage therebetween, said portions having their adjacent ends open and axially spaced to provide communication between said annular passage and the open end of said outer portion, an open-ended tubular member slidably received within said inner portion and axially movable into open and closed positions relative to a seat formed at the open end of said outer portion, means for moving said member into said respective positions including movement inwardly of said inner body portion and away from said seat for opening, and outwardly of said inner body portion and toward said seat for closing, and means subjecting said member to substantially balanced fluid pressure conditions at both ends and interiorly and exteriorly thereof substantially throughout its length.

16. A tube valve having an outer casing providing an outlet, an inner shell in fixed relation to said casing and spaced therefrom to form an annular passage communicating with said valve outlet, said shell being closed at its upstream end and open at its opposite downstream end, a tubular member open at both ends and axially movable in telescoping relation with said shell for controlling the flow of fluid through said valve, said shell and member being formed to provide an annular space between telescoping wall portions, means for extending said member relative to said shell to close said valve and for contracting said member relative to said shell to open said valve, means disposed within the closed end of said shell out of contact with fluid flowing through said valve for moving said member into said respective positions, and means for maintaining pressures within said annular space substantially equal to pressures interiorly of said member throughout its length.

17. In a valve comprising outer and inner body portions forming an annular fluid flow passage communicating with the valve outlet, a closure tube open at both ends and exposed throughout its interior to fluid flow conditions within said valve, said closure tube being slidable within a cylindrical recess at one end of said inner body portion in axial relation to said outlet for controlling the flow of fluid therethrough, and means for improving flow characteristics of the controlled fluid comprising a fluid flow connection extending across said annular passage from the exterior of the valve to said recess, and means for introducing fluid through said connection to the interior of said closure tube.

18. A valve comprising an outer body portion having an outlet orifice, an inner body portion spaced from the inner walls of said outer portion and formed at one end to provide a cylindrical recess opening toward said orifice, a tubular member received within said recess and axially movable with respect to said orifice to control the flow of fluid therethrough, and means forming a resilient seal between said member and said inner body portion when the member is moved to a closed position relative to said orifice comprising annularly formed projections on said inner body portion and said member arranged in overlapping relation transversely of said axial movement, and packing material disposed between said projections.

19. In a valve comprising outer and inner body portions forming an annular fluid flow passage communicating with the valve outlet, a tubular closure element open at both ends and exposed throughout its interior to fluid flow conditions within said valve whereby under certain conditions of flow an excessive negative pressure condition tends to develop within said element adjacent the stream of fluid flowing into said outlet, said closure element being slidable within a cylindrical recess at one end of said inner body portion in axial relation to said outlet for controlling the flow of fluid therethrough, and means for relieving said negative pressure condition within said closure element comprising a fluid flow connection extending across said annular passage from the exterior of said valve to said recess for introducing fluid to the interior of said element whenever negative pressures develop therein.

20. In a valve comprising outer and inner body portions forming an annular fluid flow passage communicating with the valve outlet, a plurality of rib members extending radially across said passage at circumferentially spaced locations for rigidly connecting and supporting said portions, a tubular closure element open at both ends and exposed throughout its interior to fluid flow conditions within said valve whereby under certain conditions of flow an excessive negative pressure condition tends to develop within said element adjacent the stream of fluid flowing into said outlet, said closure element being slidable within a cylindrical recess at one end of said inner body portion in axial relation to said outlet for controlling the flow therethrough, and means for relieving said negative pressure condition within said closure element comprising a plurality of fluid flow connections formed within one or more of said rib members and extending from the exterior of said valve to the interior of said recess for introducing fluid to the interior of said element whenever negative pressures develop therein.

PHILLIP A. KINZIE.
JOHN L. SAVAGE.